(12) United States Patent
Hatano et al.

(10) Patent No.: US 11,876,555 B2
(45) Date of Patent: Jan. 16, 2024

(54) FAILURE DETERMINATION SYSTEM AND FAILURE DETERMINATION METHOD

(71) Applicant: NIPPON TELEGRAPH AND TELEPHONE CORPORATION, Tokyo (JP)

(72) Inventors: Tomoya Hatano, Musashino (JP); Takumi Harada, Musashino (JP); Hiroo Suzuki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 135 days.

(21) Appl. No.: 17/601,706

(22) PCT Filed: Apr. 23, 2019

(86) PCT No.: PCT/JP2019/017179
§ 371 (c)(1),
(2) Date: Oct. 5, 2021

(87) PCT Pub. No.: WO2020/217299
PCT Pub. Date: Oct. 29, 2020

(65) Prior Publication Data
US 2022/0200698 A1   Jun. 23, 2022

(51) Int. Cl.
*H04B 10/07* (2013.01)
*H04B 10/079* (2013.01)
*H04B 10/071* (2013.01)

(52) U.S. Cl.
CPC ....... *H04B 10/0791* (2013.01); *H04B 10/071* (2013.01); *H04B 10/0793* (2013.01)

(58) Field of Classification Search
CPC ............ H04B 10/0791; H04B 10/0793; H04B 10/071
See application file for complete search history.

(56) References Cited

U.S. PATENT DOCUMENTS 5,739,933 A * 4/1998 Dembeck ........... H04Q 11/0003
398/45
5,831,752 A * 11/1998 Cotter ................... H04L 7/0075
398/155

(Continued)

FOREIGN PATENT DOCUMENTS

JP    2014171120 A    9/2014

OTHER PUBLICATIONS

"Technical Basic Course [GE-PON Technology], 1st What is PON?", Nippon Telegraph and Telephone Corporation, NTT Technology Journal, Aug. 2005, pp. 71 to 74.

*Primary Examiner* — Dzung D Tran
(74) *Attorney, Agent, or Firm* — Harness, Dickey & Pierce, P.L.C.

(57) ABSTRACT

A breakdown determination system includes a switching device that switches a transmission path of optical signals between an upper network and a lower network, one or more intermediate communication devices that relay communication between the upper network and the lower network, a selection device that selects a standby port of the intermediate communication devices, a measurement device that connects to the selected standby port via the switching device and measures an optical signal of the connected standby port, a determination device that determines whether an intermediate communication device including the selected standby port breaks down based on a result of measuring the optical signal, and a storage device that stores a result of determining whether the intermediate communication device breaks down.

7 Claims, 12 Drawing Sheets

(56) References Cited

U.S. PATENT DOCUMENTS

2003/0076560 A1\* 4/2003 Pratt .................. H04J 14/0252
398/79
2018/0102848 A1\* 4/2018 Sabat, Jr. ......... H04B 10/25752

\* cited by examiner

| ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA UPPER COMMUNICATION DEVICE #A | #1 | #1 | BBBB INTERMEDIATE COMMUNICATION DEVICE #B |
| | #2 | #2 | |
| CCCC LOWER COMMUNICATION DEVICE #C | #1 | #3 | |
| | #2 | #4 | |

| PHYSICAL WIRING INFORMATION ||  |
|---|---|---|
| SWITCHING DEVICE INFORMATION | COMMUNICATION DEVICE INFORMATION ||
| PHYSICAL PORT NUMBER | COMMUNICATION PORT NUMBER | IDENTIFICATION INFORMATION SERIAL NUMBER |
| #11 | #1 | AAAA UPPER COMMUNICATION DEVICE #A |
| #12 | #2 | |
| #21 | #1 | BBBB INTERMEDIATE COMMUNICATION DEVICE #B |
| #22 | #2 | |
| #23 | #3 | |
| #24 | #4 | |
| #31 | #1 | DDDD INTERMEDIATE COMMUNICATION DEVICE #D |
| #32 | #2 | |
| #33 | #3 | |
| #34 | #4 | |
| #41 | #1 | CCCC LOWER COMMUNICATION DEVICE #C |
| #42 | #2 | |

Fig. 8

FAILURE DETERMINATION SYSTEM AND FAILURE DETERMINATION METHOD

CROSS-REFERENCE TO RELATED APPLICATIONS

This application is a 371 U.S. National Phase of International Application No. PCT/JP2019/017179 filed on Apr. 23, 2019. The entire disclosures of the above application is incorporated herein by reference

TECHNICAL FIELD

The present disclosure relates to a breakdown determination system and a breakdown determination method.

BACKGROUND ART

In optical communication networks, communication ports, packages, and devices for performing communication are designed with redundancy for a case in which the communication ports, the packages, and the devices break down or for a case in which the packages and the devices are updated or replaced. In a case in which breakdown has occurred or the devices are to be updated or replaced, the optical communication networks switch the communication ports, the packages, and the devices to be used for communication using communication protocols or communication control schemes to cause the communication to be continued. Specific examples of the design with redundancy and the communication control schemes include the following examples. In a layer 2 protocol, link aggregation has widely been distributed as a scheme for route redundancy, device redundancy, and package redundancy. As a scheme for device redundancy and device redundancy, spanning tree protocol has widely been distributed.

While design with redundancy as described above has been distributed, an access section connecting devices installed on the side of users who use an optical communication network and an accommodation device that accommodates the devices are not designed with redundancy in many cases. This is because in the access section, the number of communication ports, packages, and devices that are targets to be designed to be redundant is very large and this leads to an increase in costs for the design with redundancy. In a case in which breakdown has occurred or packages and devices are to be updated or replaced for an access section that is not designed with redundancy, engineers visit the site to address the breakdown or perform updating or replacement.

It is necessary for the engineers to visit the site and to address the breakdown or perform updating or replacement for an optical communication network that is not designed with redundancy, and this is one of the reasons that the costs incurred in running a communication system are high. Also, communication is continuously disconnected until the engineers complete addressing of the breakdown, updating, or replacement, and this is one of reasons that convenience for users is degraded.

CITATION LIST

Non Patent Document

Non Patent Document 1: "Basic Course for Technology [GE-PON] Part 1, What is PON", Nippon Telegraph and Telephone Corporation, NTT Technical Journal, August, 2005, pp. 71 to 74

SUMMARY OF THE INVENTION

Technical Problem

To prepare for a case in which a communication device of an active system breaks down, a communication device for standby (hereinafter referred to as a "standby device") is equipped in advance in central offices such as data centers. In a case in which a communication device in an active system breaks down, an engineer replaces the communication device that has broken down with the standby device and switches a transmission path of optical signals to the replaced standby device in a central office. Because the engineer visits the central office and switches the transmission path of the optical signals, a time required to recover the communication device from the breakdown becomes long in some cases. Thus, the operator may remotely operate a robot patch panel (RPP) provided in the central office and switch the transmission path of the optical signals to the standby system in order to recover the communication device from the breakdown early.

However, in a case in which the replaced standby device has also broken down, and only only the replaced standby device is equipped hi the central office, a time to recover the communication device from the breakdown becomes long. Although a plurality of standby devices may be equipped in advance in the central office for the case in which the replaced standby device has broken down, the cost burden is high. The breakdown determination system thus needs to confirm that the standby device has not broken down before the transmission path is switched to the standby system. However, the breakdown determination system cannot remotely confirm that the standby device has not broken down before the transmission path is switched to the standby system.

In view of the aforementioned circumstances, an object of the present disclosure is to provide a breakdown determination system and a breakdown determination method enable remote confirmation that a standby device has not broken down before a transmission path is switched to a standby system.

Means for Solving the Problem

According to an aspect of the present disclosure, there is provided a breakdown determination system including a switching device configured to switch a transmission path of optical signals between an upper network and a lower network, one or more intermediate communication devices configured to relay communication between the upper network and the lower network, a selection device configured to select a standby port of the one or more intermediate communication devices, a measurement device configured to connect, via the switching device, to the standby port that is selected and measure an optical signal of the standby port that is connected, a determination device configured to determine whether an intermediate communication device of the one or more intermediate communication devices including the standby port that is selected breaks down based on a result of measuring the optical signal, and a storage device configured to store a result of determining whether the intermediate communication device breaks down.

According to an aspect of the present disclosure, in the aforementioned breakdown determination system, the selection device selects the standby port that meets a condition of a communication standard of the optical signal.

According to an aspect of the present disclosure, in the aforementioned breakdown determination system, the selection device periodically selects the standby port of the one or more intermediate communication devices.

According to an aspect of the present disclosure, there is provided a breakdown determination method executed by a breakdown determination system, the method including switching a transmission path of optical signals between an upper network and a lower network, selecting a standby port of an intermediate communication device configured to relay communication between the upper network and the lower network, connecting, via a switching device configured to switch the transmission path of the optical signals between the upper network and the lower network, to the standby port that is selected and measuring an optical signal of the standby port that is connected, determining whether the intermediate communication device including the standby port that is selected breaks down based on a result of measuring the optical signal, and recording, in a storage device, a result of determining whether the intermediate communication device breaks down.

Effects of the Invention

According to the present disclosure, it is possible to remotely confirm that the standby device has not broken down before the transmission path is switched to the standby system.

BRIEF DESCRIPTION OF DRAWINGS

FIG. 8 is a diagram illustrating an example of physical wiring information.

DESCRIPTION OF EMBODIMENTS

Hereinafter, a breakdown determination system and a breakdown determination method according to embodiments of the present disclosure will be described with reference to the drawings. Note that in the following embodiments, repeated description will be appropriately omitted on the assumption that components with the same reference signs applied thereto perform similar operations.

Figure 1:
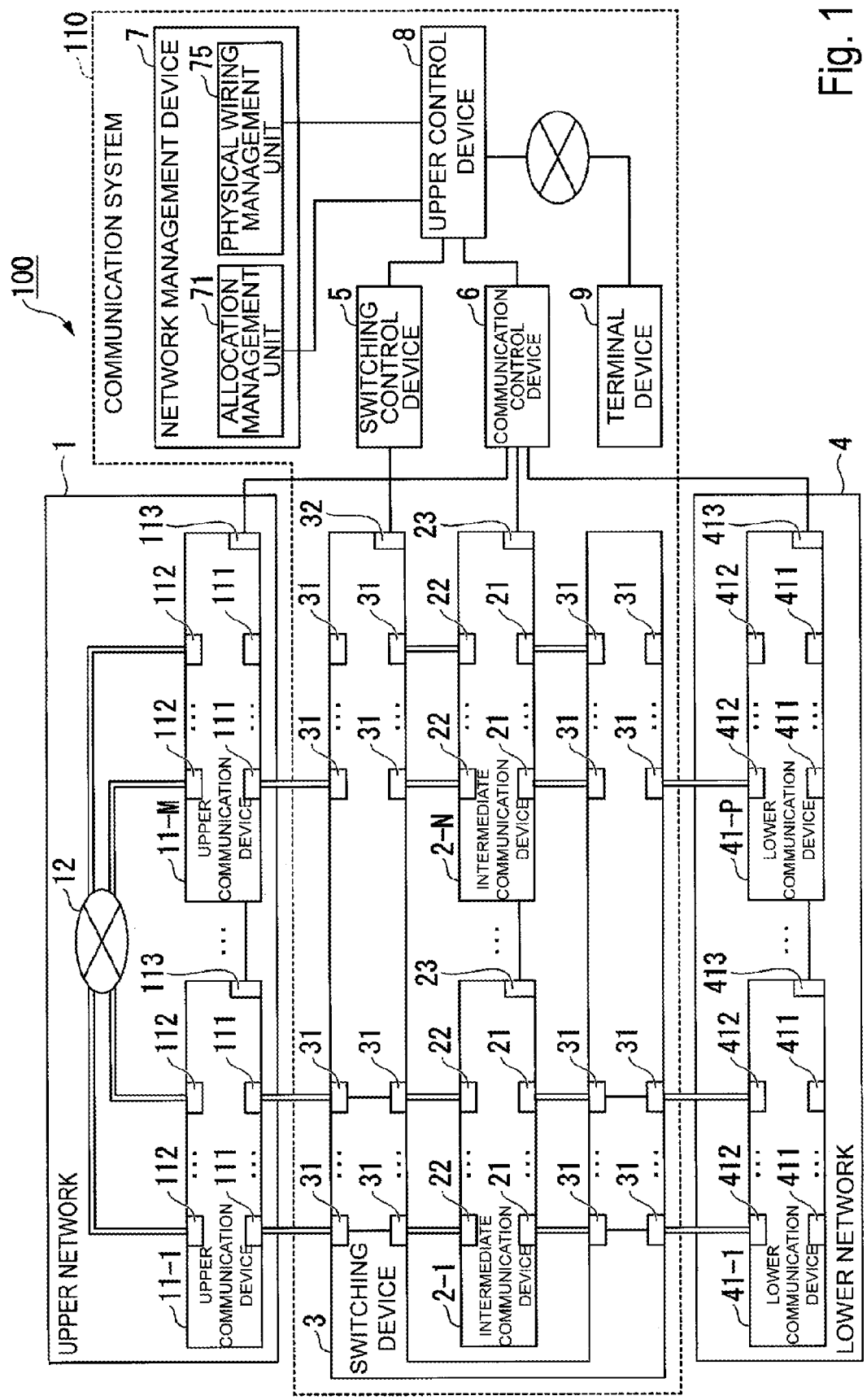
FIG. 1 is a diagram illustrating a configuration example of an optical communication network.

FIG. 1 is a diagram illustrating a configuration example of an optical communication network 100. The optical communication network 100 includes an upper network 1, a conmiunication system 110, and a lower network 4. The communication system 110 relays optical signals used in communication between the upper network 1 and the lower network 4. The communication system 110 enables communication between the upper network 1 and the lower network 4 to be designed with redundancy and enables running costs of the optical communication network 100 to be reduced.

In a case in which the upper network 1 is a network connected to a backbone network, and the lower network 4 is a user-side network, for example, the communication system 110 is provided in a central office that accommodates a communication line with the user side network and relays communication between the backbone network and the user-side network. Also, in a case in which the upper network 1 is a network that connects a baseband unit (BBU) and a backhaul of a mobile communication system, and the lower network 4 is a network including a plurality of antenna devices (RRHs), the communication system 110 is provided in a central office that accommodates a communication line between each RRH and the BBU and relays communication between the BBU and the RRH. Hereinafter, although a case in which the communication system 110 relays communication between a backbone network and a user-side network will be described in the embodiments, targets of application of the communication system 110 are not limited thereto.

The upper network 1 includes a communication line 12 that is connected to the backbone network or another optical communication network and M upper communication devices 11 (11-1, . . . , 11-M) connected to the communication line 12. The upper communication device 11 includes a plurality of one communication port 111, a plurality of communication ports 112, and a setting port 113. The conmiunication ports 112 are connected to the communication line 12. The communication ports 111 are connected to the communication system 110. The setting port 113 is connected to the communication system 110 and receives device setting information. The device setting information supplied to the setting port 113 defines operations of the upper communication device 11 related to relay of optical signals and signal processing between the communication port 112 and the communication port 111. The upper communication device 11 relays communication between the communication line 12 and the communication system 110 based on the device setting information. The number of communication ports 111 and conmiunication ports 112 included in the upper communication device 11 may be one.

The lower network 4 includes P lower communication devices 41 (41-1, . . . , 41-P) connected to user-side devices. The lower communication device 41 includes a plurality of communication ports 411, a plurality of communication ports 412, and a setting port 413. The communication ports 412 are connected to the communication system 110. The communication ports 411 are connected to user-side devices. The setting port 413 is connected to the communication system 110 and receives device setting information. The device setting information supplied to the setting port 413 defines operations of the lower communication device 41 related to relay of optical signals and signal processing between the communication ports 412 and the communication ports 411. The lower communication device 41 relays communication between the communication system 110 and user-side devices based on the device setting information. The number of communication ports 411 and communication ports 412 included in the lower communication device 41 may be one.

M and P represent the number of upper communication devices 11 and lower communication devices 41, respectively, and are integers that are equal to or greater than one. In the configuration example illustrated in FIG. 1, although a case in which each of the numbers of upper communication devices 11 and lower communication devices 41 is equal to or greater than two is illustrated, one or both of the number of upper communication devices 11 and lower communication devices 41 may be one.

The communication system 110 includes N intermediate communication devices 2 (2-2, ..., 2-N), a switching device 3, a switching control device 5, a communication control device 6, a network management device 7, an upper control device 8, and a terminal device 9. Each intermediate communication device 2 includes at least one communication port 22 used for communication with the upper network 1, at least one communication port 21 used for communication with the lower network 4, and a setting port 23 that receives device setting information. The device setting information defines operations of the intermediate communication device 2 related to relay of optical signals between the communication port 22 and the communication port 21. The communication port 22 is also referred to as an upper port of the intermediate communication device 2. The communication port 21 is also referred to as a lower port of the intermediate communication device 2.

The intermediate communication device 2 outputs, from any of the communication ports 21, an optical signal input from the communication port 22 based on the device setting information supplied from the communication control device 6 to the setting port 23. The optical signal input from the communication port 22 may be output from one communication port 21 or may be output from a plurality of communication ports 21. In a case in which the optical signal includes signals of a plurality of wavelength division multiplexed wavelength signals, for example, a signal of each wavelength demultiplexed from the optical signal may be output to the plurality of communication ports 21 based on an output destination defined for each wavelength in the device setting information. Also, the intermediate communication device 2 outputs, from any of the communication ports 22, an optical signal input from the communication port 21 in accordance with the device setting information. In a case in which wavelength division multiplexed optical signals are used for communication with the upper network 1, for example, the intermediate communication device 2 combines optical signals with different wavelength from among optical signals input from the communication ports 21 and outputs one optical signal obtained through the combination from the communication port 22. Signal processing performed on the optical signals input from the communication port 21 and the communication port 22 is not limited to the aforementioned example.

At least one of the plurality of intermediate communication devices 2 has communication ports 21 and 22 that do not relay communication between the upper network 1 and the lower network 4 to prepare for a case in which another intermediate communication device 2 breaks down or in a case in which communication ports 21 and 22 of another intermediate communication device 2 break down. Also, in at least one of the plurality of intermediate communication devices 2, all the communication ports 21 and 22 may not relay the communication between the upper network 1 and the lower network 4. Such an intermediate communication device 2 is a standby device provided in case of breakdown, updating, or replacement of another intermediate communication device 2. The communication system 110 may include one or more intermediate communication devices 2 as standby devices.

The switching device 3 includes a plurality of physical ports 31 and a control port 32. Each physical port 31 is connected to any one of the communication ports 111 included in the upper communication device 11, the communication ports 21 and 22 included in the intermediate communication device 2, and the communication ports 412 included in the lower communication device 41. Each physical port 31 includes a connector with a form in accordance with a connector attached to an optical fiber cable and performs input and Output of optical signals. The switching device 3 receives control information from the switching control device 5 via the control port 32. The switching device 3 connects two physical ports among a plurality of physical ports in accordance with the control information and enables transmission of optical signals between the two physical ports. For example, the switching device 3 is configured to switch an optical fiber cable connecting between the physical port 31 and another physical port 31 with a robot arm. Alternatively, the switching device 3 includes a micro-electro-mechanical systems (MEMS) mirror device and enables transmission of optical signals between the two physical ports 31 via the controlled MEMS mirrors. Not limited to the aforementioned example, the switching device 3 is only required to be configured to be able to change the transmission path for optical signals by selecting a pair of two physical ports 31.

The switching control device 5 controls the switching device 3 in response to an instruction received from the upper control device 8. The instruction received from the upper control device 8 indicates that two physical ports 31 are to be connected. The instruction may indicate that a plurality of pairs of physical ports 31 are to be connected.

The communication control device 6 supplies device setting information to the upper communication device 11, the intermediate communication device 2, and the lower communication device 41 to control operations of each of the upper communication device 11, the intermediate communication device 2, and the lower communication device 41, in response to instructions received from the upper control device 8. Device setting information supplied to the upper communication device 11 defines signal processing to be performed on optical signals input from the communication ports 111 and the communication ports 112 of the upper communication device 11 and defines the communication ports 111 or the communication ports 112 to which optical signals obtained through the signal processing are to be output. Similarly, device setting information supplied to the lower communication device 41 defines signal processing to be performed on optical signals input from the communication ports 411 and the communication ports 412 and defines the communication ports 411 or the communication ports 412 to which optical signals obtained through the signal processing are to be output, The network management device 7 includes an allocation management unit 71 and a physical wiring management unit 75. The allocation management unit 71 stores and updates allocation information. The allocation information includes the following two kinds of information. The first kind of information is information indicating connection between the communication ports 111 of the upper communication device 11 and the communication ports 22 of the intermediate communication device 2, which are connected via the switching device The second kind of information is information indicating connection between the communication ports 21 of the intermediate communication device 2 and the communication ports 412 of the lower communication device 41, which are connected via the switching device 3. The allocation information indicates the intermediate communication device 2 and the communication ports 21 and 22 thereof allocated to the communication between the upper network 1 and the lower network 4.

The physical wiring management unit 75 stores and updates physical wiring information. The physical wiring information includes the following three kinds of information. The first kind of information is information indicating connection between the communication ports 111 of the upper communication device 11 and the physical ports 31 of the switching device 3. The second kind of information is information indicating connection between the switching device 3 and the communication ports 21 and 22 of the intermediate communication device 2. The third kind of information is information indicating connection between the physical ports 31 of the switching device 3 and the communication ports 412 of the lower communication device 41. The physical wiring information indicates connection between each of the communication ports of the upper communication device 11, the intermediate communication device 2, and the lower communication device 41 and the physical ports 31 of the switching device 3.

The upper control device 8 supplies an instruction for switching connection of the physical ports 31 to the switching control device 5 in response to an instruction received from the terminal device 9 connected via another network. The terminal device 9 receives inputs from engineers who run and maintain the optical communication network 100 and supplies instructions to the upper control device 8. The terminal device 9 is provided at a different location from the central office where the intermediate communication device 2 and the switching device 3 are placed. The engineers operate the switching device 3 through a remote operation. The communication system 110 acquires state information regarding a communication state between the upper network 1 and the lower network 4 via the terminal device 9. The state information indicates, for example, disconnection of communication in the optical communication network 100, breakdown of the intermediate communication device 2, breakdown of the communication ports 21 and 22 of the intermediate communication device 2, or a change in communication line to be provided to users who use the optical communication network 100.

For example, the engineers receive contact regarding breakdown of the intermediate communication device 2 and contact regarding communication disconnection from users who use the optical communication network 100 and operate the switching device 3. The engineers switch the intermediate communication device 2 and the communication ports 21 and 22 thereof to be allocated to communication through operations of the switching device 3 for recovery from the breakdown or the communication disconnection. Also, the engineers operate the switching device 3 in response to requests from the users who use the optical communication network 100. Examples of requests from the users include changes in band of communication lines provided to the users, stopping of utilization of communication lines, addition of new communication lines, and the like. In a case in which such requests are received, the optical communication network 100 changes the intermediate communication device 2 to be connected to the lower communication device 41, changes communication ports 21 of the intermediate communication device 2 to be connected to the lower communication device 41, and increases or reduces the number of communication ports 21 to be connected to the lower communication device 41.

The communication system 110 switches the intermediate communication device 2 and the communication ports 21 and 22 thereof allocated to the relay of the communication between the upper network 1 and the lower network 4, using the switching device 3. Through the switching of the intermediate communication device 2 or the communication ports 21 and 22 using the switching device 3, it is possible to recover from breakdown of the intermediate communication device 2 or update or replace the intermediate communication device 2 without a need for the engineers to visit the central office where the intermediate communication device 2 is installed. The communication system 110 can reduce the running costs of the optical communication network 100 and shorten the period of time during which communication cannot be performed by eliminating a necessity of the engineers to perform operations in the central office.

Also, since the communication system 110 can freely change the intermediate communication device 2 to be connected to the upper network 1 and the lower network 4, it is possible to achieve design of each intermediate communication device 2 with redundancy without providing a standby device for each intermediate communication device 2 used for communication. The communication system 110 can also reduce costs incurred to design the intermediate communication device 2 with redundancy by including the number of the intermediate communication devices 2 according to a level of redundancy. Also, the communication system 110 can also change the communication lines to be provided to the users in a shorter time as compared with a case in which engineers visit the central office, by switching the connection using the switching device 3.

Figure 2:
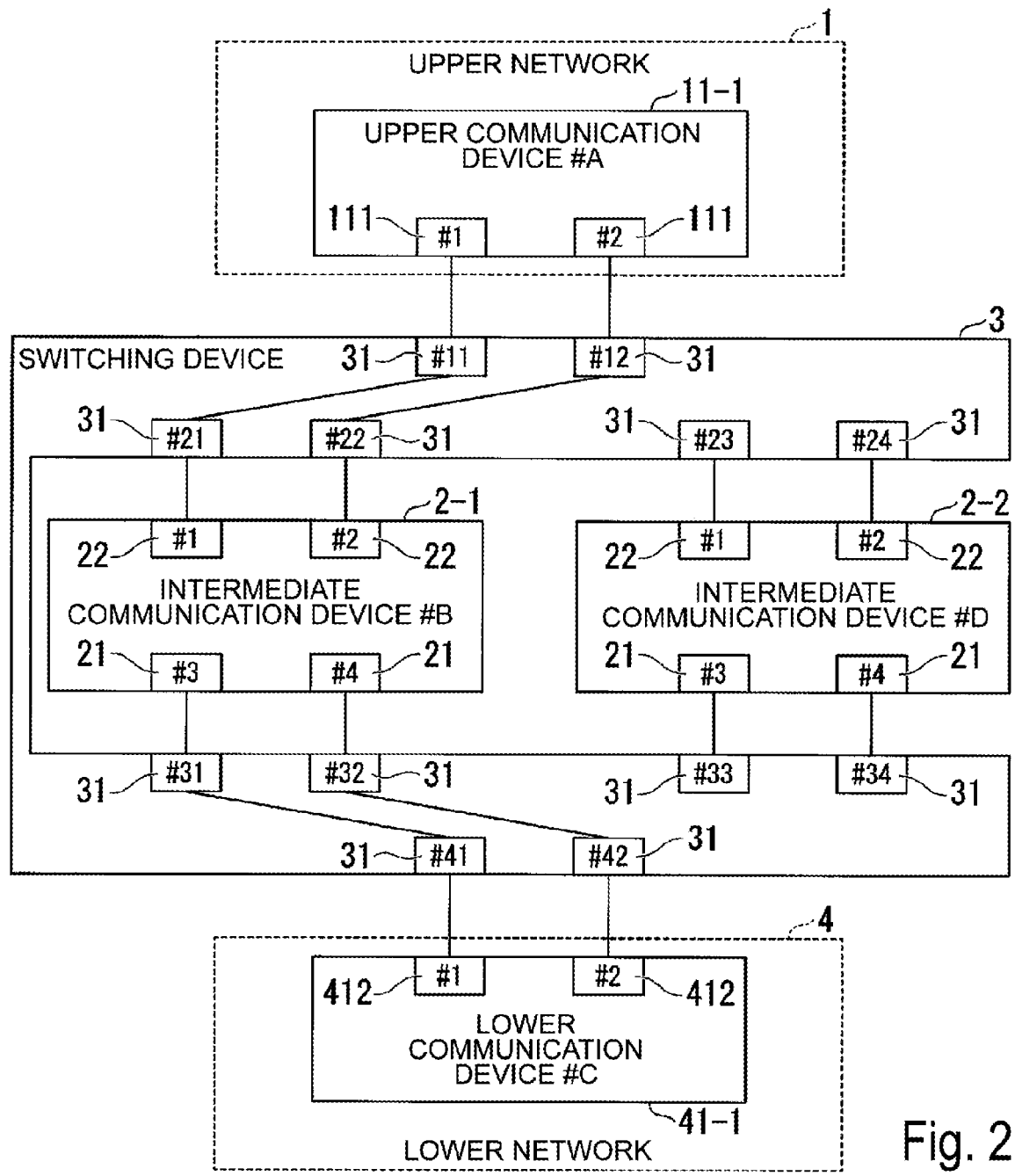
FIG. 2 is a diagram illustrating a connection example between each of the upper communication devices, the intermediate communication devices, and the lower communication devices and a switching device.

Hereinafter, configurations of the switching control device 5, the allocation management unit 71, and the physical wiring management unit 75 will be described. Here, the connection example illustrated in FIG. 2 will be used for specifically explaining connection between each of the upper communication device 11, the intermediate communication devices 2, and the lower communication device 41 and the switching device 3. FIG. 2 is a diagram illustrating a connection example between each of the upper communication device 11, the intermediate communication devices 2, and the lower communication device 41 and the switching device 3. In the connection example illustrated in FIG. 2, the upper network 1 includes an upper communication device 11-1 "#A", the communication system 110 includes an intermediate communication device 2-1 "43" and an intermediate communication device 2-2 "#D", and the lower network 4 includes a lower communication device 41-1 "#C". Further, the upper communication device 11-1 "#A" includes two communication ports 111 "#1" and "#2". Each of the intermediate communication devices 2-1 "#B" and 2-2 "#D" includes two communication ports 22 "#1" and "#2" and two communication ports 21 "#3" and "#4". The lower communication device 41-1 "#C" includes two communication ports 412 "#1" and "#2". The communication ports and the physical ports to which the same names and reference signs are applied will be distinguished with combinations of "#" and numbers.

Twelve physical ports 31 "#11", "#12", "#21", "#22", "#23", "#24", "#31", "#32", "#33", "#34", "#41", and "#42" from among the plurality of physical ports 31 included in the switching device 3 are used for connection to the upper communication device 11, the intermediate communication devices 2, and the lower communication device 41. The connection example illustrated in FIG. 2 illustrates physical ports 31 used for connection from among the plurality of physical ports 31 included in the switching device 3.

The physical ports 31 "#11" and "#12" are connected to the communication ports 111 "#1" and "#2" of the upper communication device 11-1 "#D", respectively. The physical ports 31 "#21" and "#22" are connected to the communication ports 22 "#1" and "#2" of the intermediate communication device 2-1 "#13", respectively. The physical ports 31 "#23" and "#24" are connected to the communication ports 22 "#1" and "#2" of the intermediate communication device 2-2 "#1", respectively. The physical ports 31 "#31" and "#32" are connected to the communication ports 21 "#3" and "#4" of the intermediate communication device 2-1 "#B", respectively. The physical ports 31 "#33" and "#34" are connected to the communication ports 21 "#3" and "#4" of the intermediate communication device 2-2 "#D", respectively. The physical ports 31 "#41" and "#42" are connected to the communication ports 412 "#1" and "#2" of the lower communication device 41-1 "#C", respectively.

In the switching device 3, the physical ports 31 "#11" and "#12" are connected to the physical ports 31 "#21" and "#22", respectively. The physical ports 31 "#31" and "#32" are connected to the physical ports 31 "#41" and "#42", respectively. The connection between the physical ports 31 in the switching device 3 can be switched as described above, FIG. 3 is a block diagram illustrating a configuration example of the switching control device 5. The switching control device 5 includes an interface 51, a wiring information acquisition unit 52, a switching device wiring information storage unit 53, a wiring availability determination unit 54, a wiring instruction unit 55, a response receiving unit 56, and a wiring information updating unit 57. The interface 51 performs inputs from and outputs to the upper control device 8.

The interface 51 receives connection change information and request information as control information from the upper control device S. The connection change information indicates an instruction for changing connection between the physical ports 31 in the switching device 3. The request information indicates a request for switching device wiring information stored in the switching device wiring information storage unit 53. The interface 51 notifies the upper control device 8 of a response indicating completion or unavailability of change in connection based on the connection change information. In addition, the interface 51 supplies the switching device wiring information as a response to the request information to the upper control device 8.

If the interface 51 receives the request information, then the wiring information acquisition unit 52 reads the switching device wiring information stored in the switching device wiring information storage unit 53 and supplies the read switching device wiring information to the interface 51.

Figures 3, 4:
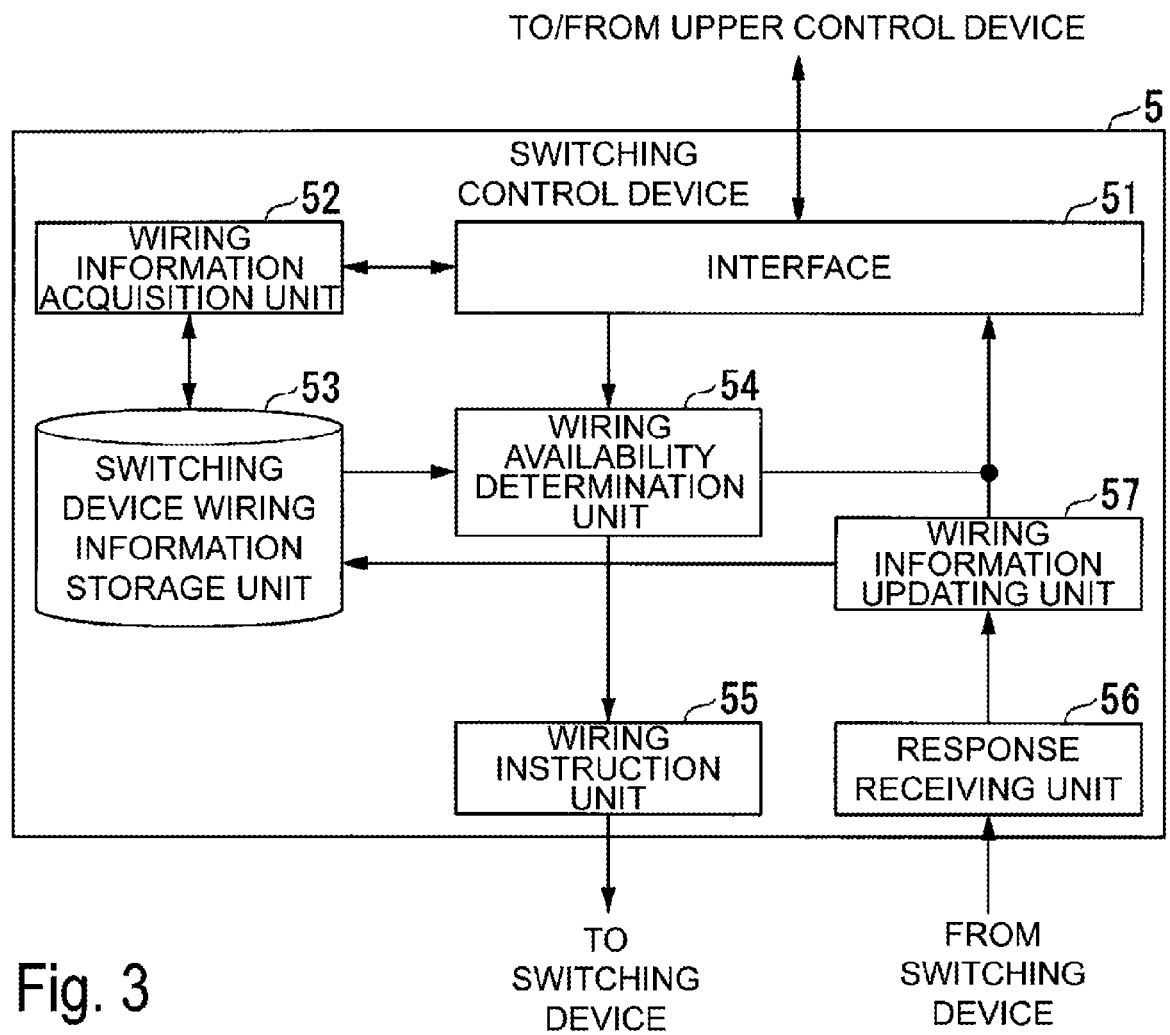
FIG. 3 is a block diagram illustrating a configuration example of a switching control device.
FIG. 4 is a diagram illustrating an example of switching device wiring information.

The switching device wiring information storage unit 53 stores the switching device wiring information. The switching device wiring information indicates connection between the physical ports 31 in the switching device 3. The switching device wiring information includes information indicating a pair of physical port numbers for identifying two connected physical ports 31. FIG. 4 is a diagram illustrating an example of the switching device wiring information. The switching device wiring information illustrated in FIG. 4 illustrates connection between the physical ports 31 in the connection example illustrated in FIG. 2. The switching device wiring information illustrated in FIG. 4 includes the pair of physical port numbers "#11" and "#21" and indicates that the physical ports 31 indicated by the physical port numbers are connected to each other. Similarly, the switching device wiring information indicates that the physical ports 31 "#12" and "#22" are connected to each other, the physical ports 31 "#41" and "#23" are connected to each other, and the physical ports 31 "#42" and "#24" are connected to each other. Note that the switching device wiring information may be divided into upper wiring information indicating a pair of physical port numbers related to connection between the upper network 1 and the communication port 22 and lower wiring information indicating a pair of physical port numbers related to connection between the lower network 4 and the communication port 22.

If the interface 51 receives connection change information, then the wiring availability, determination unit 54 determines whether it is possible to change connection as indicated by the connection change information, based on the switching device wiring information. In a ease in which it is possible to change connection, the wiring availability determination unit 54 supplies the connection change information to the wiring instruction unit 55. In a case in which it is not possible to change connection, the wiring availability determination unit 54 notifies the interface 51 of a response indicating that it is not possible to change the connection. In a case in which the connection change information indicates an instruction for a change of connecting the physical port 31 "#23" to the physical port 31 "#12" that has already been connected to the physical port 31 "#22", the wiring availability determination unit 54 determines that it is not possible to connect a plurality of physical ports to the physical port 31 "#12" and determines that it is not possible to achieve the connection. At this time, the wiring availability determination unit 54 supplies a response indicating that it is not possible to change the connection to the interface 51.

The wiring instruction unit 55 supplies an instruction for changing the connection based on the connection change information to the control port 32 of the switching device 3. The response receiving unit 56 receives a response indicating completion of the change in connection in accordance with the connection change information from the control port 32 of the switching device 3. If the response receiving unit 56 receives the response indicating the completion of the change in connection, then the response receiving unit 56 notifies the wiring information updating unit 57 of the reception of the response. The wiring information updating unit 57 updates the switching device wiring information in accordance with the change in connection indicated h the connection change information. When the wiring information updating unit 57 ends the updating of the switching device wiring information, then the wiring information updating unit 57 notifies the interface 51 of the response indicating the completion of the change in connection based on the connection change information. The interface 51 supplies, to the upper control device 8, the response indicating the completion of the change in connection based on the connection change information in response to the notification.

Figures 5, 6:
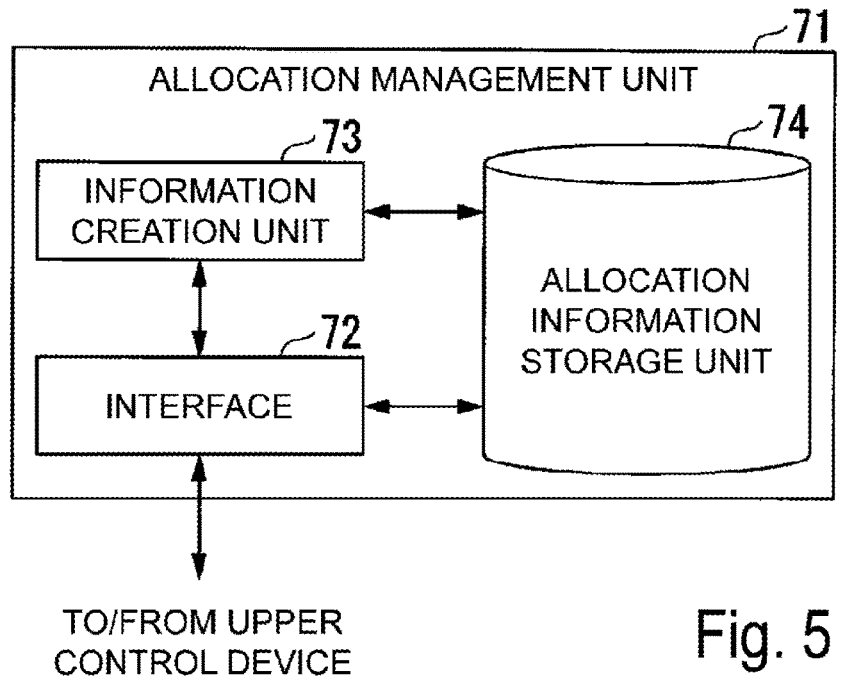
FIG. 5 is a block diagram illustrating a configuration example of an allocation management unit.
FIG. 6 is a diagram illustrating an example of allocation information.

FIG. 5 is a block diagram illustrating a configuration example of the allocation management unit 71. The allocation management unit 71 includes an interface 72, an information creation unit 73, and an allocation information storage unit 74. The interface 72 receives instructions for requesting allocation information and for updating the allocation information from the upper control device 8. When an instruction for requesting allocation information is received, then the interface 72 reads allocation information stored in the allocation information storage unit 74 and supplies the read allocation information to the upper control device 8.

When the interface 72 receives an instruction for updating the allocation information, then the interface 72 notifies the information creation unit 73 of the instruction for updating the allocation information. When the information creation unit 73 receives the instruction for updating the allocation information, then the information creation unit 73 requests the upper control device 8 for switching device wiring information and physical wiring information via the interface 72. The interface 72 supplies, to the information creation unit 73, the switching device wiring information and the physical wiring information received as a response to the request. The information creation unit 73 creates allocation information based on the switching device wiring information and the physical wiring information and updates allocation information stored in the allocation information storage unit 74 with the created allocation information.

FIG. 6 is a diagram illustrating an example of the allocation information. The allocation information includes communication device information related to each of the upper communication device 11, the intermediate communication devices 2, and the lower communication device 41 included in the optical communication network 100. The communication device information includes identification informtion for identifying each of the upper communication device 11, the intermediate communication devices 2, and the lower communication device 41 and the communication port number for identifying each of communication ports included in the devices. In other words, the communication device information uniquely specifies communication ports in the communication system 110. Also, the allocation information indicates the intermediate communication device 2 and the communication ports 21 and 22 thereof allocated to the communication between the upper network 1 and the lower network 4.

In the allocation information illustrated in FIG. 6, device serial numbers "AAAA", "BBBB", and "CCCC" are used as identification information of the upper communication device 11-1 "#A", the intermediate communication device 2-1 "#B", and the lower communication device 41-1 "#C", respectively. Also, "#1", "#2", "#3", and "#4" are used as communication port numbers indicating the communication ports of the devices. Although a case in which the serial numbers are used as identification information will be described, the upper communication device 11, the intermediate communication device 2, and the lower communication device 41 may be identified using something other than the serial numbers. For example, any one or a combination of media access control (MAC) addresses, host names, device names, Internet protocol (IP) addresses, and the like allocated to the upper communication device 11, the intermediate communication device 2, and the lower communication device 41 may be used as the identification information.

The allocation information indicating the connection example illustrated in FIG. 2 indicates that the communication port 111 "#1" of the upper communication device 11-1 "#A" corresponds to the communication port 22 "#1" of the intermediate communication device 2-1 "#B" and the communication ports thereof are connected to each other, as illustrated in FIG. 6. Similarly, the allocation information indicates that the communication port 111 "#2" of the upper communication device 11-1 "#A" and the communication port 22 "#2" of the intermediate communication device 2-1 are connected to each other. Further, the allocation information indicates that the communication port 21 "#3" of the intermediate communication device 2-1 "#B" and the communication port 42 "#1" of the lower communication device 41-1 "#C" are connected to each other and that the communication port 21 "#4" of the intermediate communication device 2-1 "#B" and the communication port 42 "#2" of the lower communication device 41-1 "#C" are connected to each other.

Figure 7:
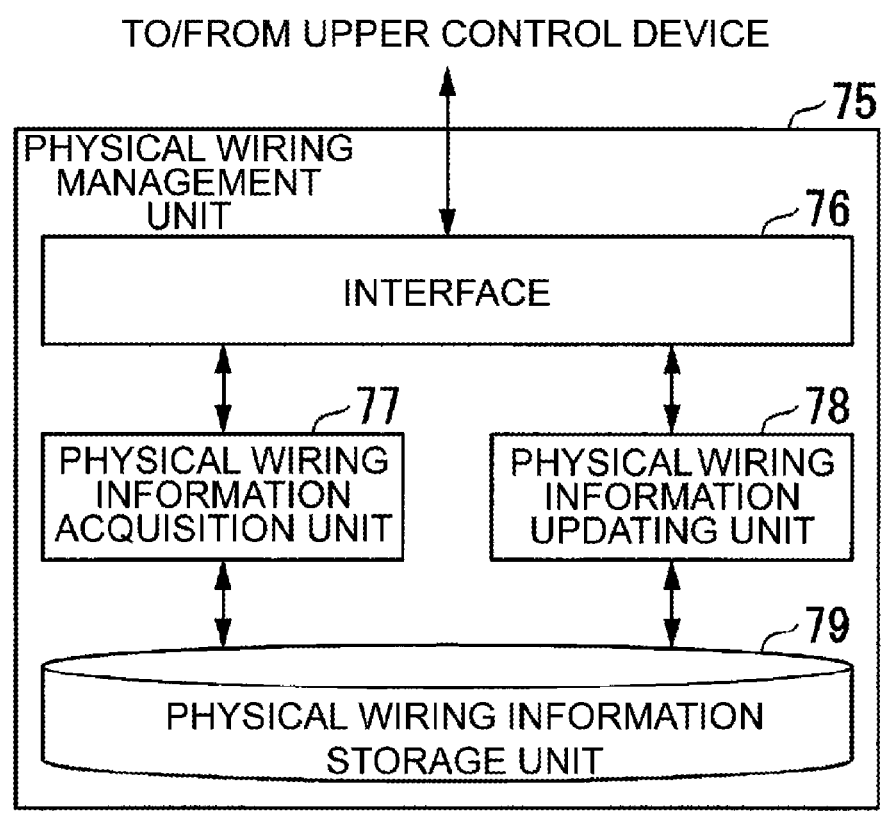
FIG. 7 is a block diagram illustrating a configuration example of physical wiring management unit.

FIG. 7 is a block diagram illustrating a configuration example of the physical wiring management unit 75. The physical wiring management unit 75 includes an interface 76, a physical wiring information acquisition unit 77, a physical wiring information updating unit 78, and a physical wiring information storage unit 79. The interface 76 receives an instruction for requesting or updating physical wiring information from the upper control device 8. When the instruction for requesting physical wiring information is received, then the interface 76 notifies the physical wiring information acquisition unit 77 of the instruction. The interface 76 receives the physical wiring information as a response to the instruction from the physical wiring information acquisition unit 77 and supplies the physical wiring information to the upper control device 8. When the interface 76 receives an instruction for updating the physical wiring information, then the interface 76 requests the upper control device 8 for physical wiring changing information. The physical wiring changing information indicates a change in connection between each of the upper communication device 11, the intermediate communication devices 2, and the lower communication device 41 and the switching device 3, when the physical wiring changing information is received, then the interface 76 supplies the physical wiring changing information to the physical wiring information updating unit 78.

The physical wiring information acquisition unit 77 reads physical wiring information from the physical wiring information storage unit 79 and supplies the read physical wiring information to the interface 76 in response to an instruction from the interface 76. When the physical wiring information updating unit 78 receives the physical wiring changing information from the interface 76, then the physical wiring information updating unit 78 updates the physical wiring information stored in the physical wiring information storage unit 79 based on the change in connection indicated by the physical wiring changing information.

FIG. 8 is a diagram illustrating an example of the physical wiring information. The physical wiring information includes switching device information or the physical port numbers indicating the physical ports 31 of the switching device 3, and communication device information related to each of the upper communication device 11, the intermediate communication devices 2, and the lower communication device 41. The physical wiring information indicates communication ports of any of the upper communication device 11, the intermediate communication devices 2, and the lower communication device 41 connected to the physical ports 31. In a case in which communication ports of any of the upper communication device 11, the intermediate communication devices 2, and the lower communication device 41 are not connected to the physical ports 31, empty (NULL) information is associated in the physical port numbers of the physical ports 31 in the physical wiring information.

In the physical wiring information illustrated in FIG. 8, serial numbers "AAAA", "BBBB", and "CCCC" are used as identification information of the upper communication device 11-1 "#A", the intermediate communication device 2-1 "#13", and the lower communication device 41-1 "#C", similarly to the example illustrated. In FIG. 6. Also, "#1", "#2", "#3", and "#4" are used as communication port numbers indicating the communication ports of the devices. In addition, "#11", "#12", "#21", "#22", "#23", "#24", "#31", "#32", "#33", "#34", "#41", and "#42" are used as physical port numbers indicating the physical ports 31.

The physical wiring information indicating the connection example illustrated in FIG. 2 indicates that the physical port 31 "#11" corresponds to the communication port 111 "#1" of the upper communication device 11-1 "A" and that the ports thereof are connected to each other, as illustrated in FIG. 8. Similarly, the physical wiring information indicates that the physical port 31 "#12" and the communication port 111 "#2" of the upper communication device 11-1 are connected to each other. Also, the physical wiring information indicates that the physical ports 31 "#21", "#22", "#23", and "#24" are connected to the communication port 22 "#1", the communication port 22 "#2", the communication port 21 "#3", and the communication port 21 "#4" of the intermediate communication device 2-1, respectively. Also, the physical wiring information indicates that the physical ports 31 "#31", "#32", "#33", and "#34" are connected to the communication port 22 "#1", the communication port 22 "#2", the communication port 21 "#3", and the communication port "#4" of the intermediate communication device 2-2, respectively. Also, the physical wiring information indicates that physical ports 31 "#41" and "#42" are connected to the communication ports 412 "#1" and "#2" of the lower communication device 41-1, respectively.

Next, the breakdown determination system will be described.

First Embodiment

Figure 9:
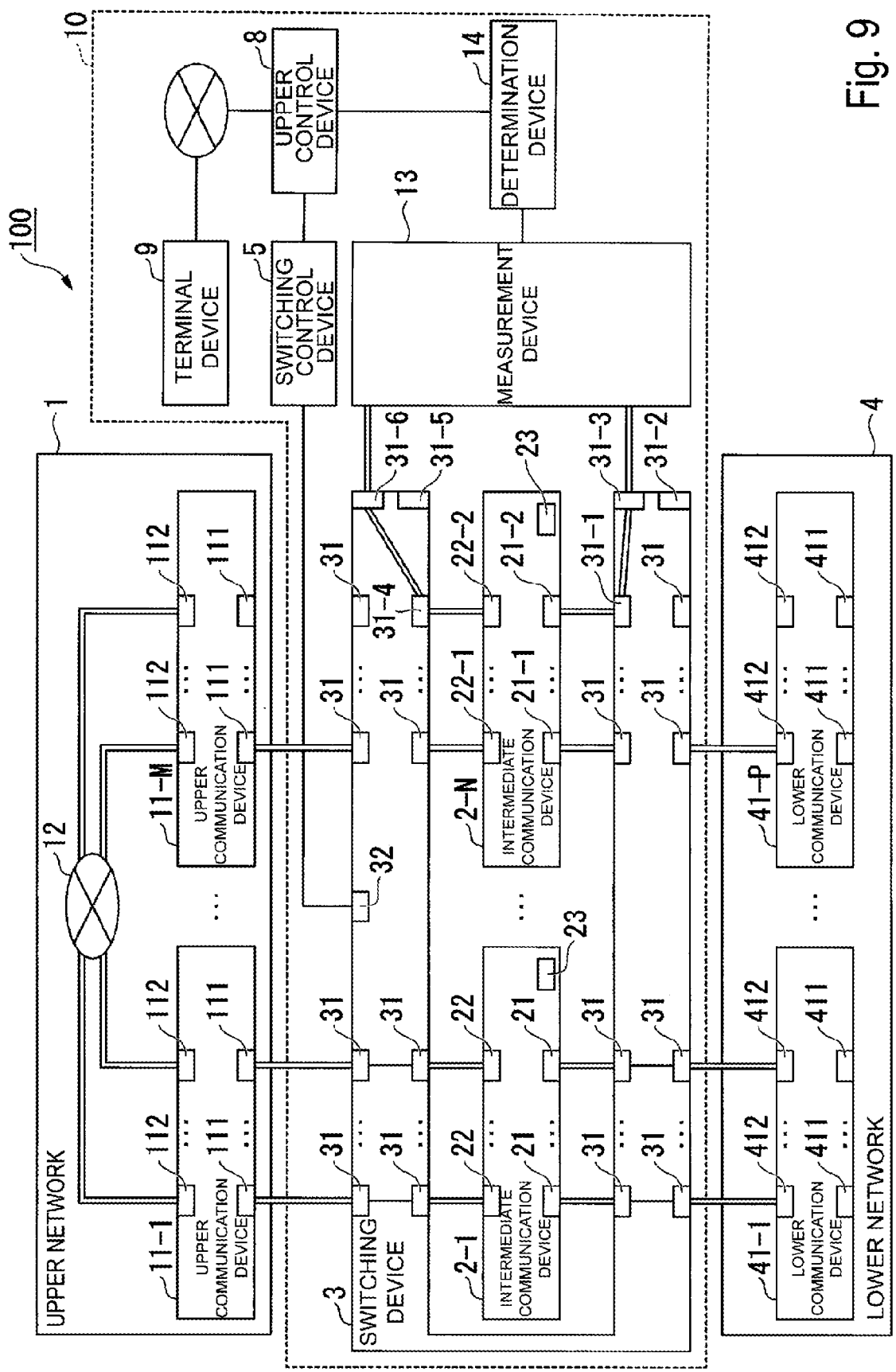
FIG. 9 is a diagram illustrating a configuration example of a breakdown determination system according to a first embodiment.

FIG. 9 is a diagram illustrating a configuration example of a breakdown determination system 10. The breakdown determination system 10 is a system that determines whether intermediate communication devices 2 in a standby system of the communication system 110 have broken down. The breakdown determination system 10 includes the intermediate communication devices 2-1 to 2-N ("N" is an integer that is equal to or greater than 2; hereinafter, "N=2"), a switching device 3, a switching control device 5, an upper control device 8, a terminal device 9, a measurement device 13, and a determination device 14.

These devices may be provided as a single device, for example, as a control unit. Some or all of the switching control device 5, the upper control device 8, and the determination device 14 are implemented as software by a processor such as a central processing unit (CPU) reading and executing a program stored in a memory which is a non-volatile recording medium (non-transitory recording medium). The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium like a storage device such as a hard disk incorporated in the computer system. The program may be transmitted via an electrical communication line. Some or all of the switching control device 5, the upper control device 8, and the determination device 14 may be implemented as hardware including an electronic circuit (or circuitry) using a large scale integration circuit (LS1), an application specific integrated circuit (ASIC), a programmable logic device (PLD), or a field programmable gate array (FPGA), for example.

The upper control device S selects a communication port for standby (hereinafter, referred to as a "standby port") included in the intermediate communication devices 2, for which whether breakdown has occurred is determined. When the intermediate communication devices 2 (standby devices) including standby ports are included in the breakdown determination system 10, for example, the upper control device S selects a standby port based on an instruction acquired from the terminal device 9.

The upper control device 8 may periodically (every month, for example) select standby port of the intermediate communication devices 2. The upper control device 8 outputs information indicating the selected standby port to the switching control device 5 using an application programming interface (API), for example. Note that the API may be used for communication (instructions, contacts, and the like) among the switching control device 5, the communication control device 6, the network management device 7, the upper control device 8, and the terminal device 9, The upper control device 8 acquires, from the determination device 14, a result of determining whether the intermediate communication device 2 including the selected standby port has broken down. The upper control device 8 records a result of determining whether the intermediate communication device 2 including the selected standby port has broken down, in a predetermined storage device for each standby port. The upper control device 8 may transmit the result of determining whether the intermediate communication device 2 including the selected standby port has broken down to the terminal device 9 for each standby port. The terminal device 9 is, for example, an information processing device.

The intermediate communication devices 2 are devices that relay communication between the upper network 1 and the lower network 4. The intermediate communication devices 2 are, for example, optical line terminals (OLTs).

The switching control device 5 is a device that controls switching of a transmission path performed by the switching device 3. The switching control device 5 acquires physical wiring information and switching device wiring information. The physical wiring information includes information indicating a physical port 31 of the switching device 3 connected to the measurement device 13. The switching control device 5 selects a combination of a physical port 31 connected to the standby port of the intermediate communication device 2 selected by the upper control device 8 and the physical port 31 that has not been registered in switching device wiring information (vacant physical port) and that is connected to the measurement device 13. The switching control device 5 provides, to the switching device 3, an instruction for wiring inside the switching device 3. In this manner, the selected standby port of the intermediate communication device 2 and the measurement device 13 are connected to each other by the switching device 3.

In FIG. 9, the switching control device 5 selects a combination of the physical port 31-1 connected to the communication port 21-2 and the physical port 31-3 such that the switching device 3 connects the communication port 21-2 of the intermediate communication device 2 to the measurement device 13. The switching control device 5 selects a combination of the physical port 31-4 connected to the communication port 22-2 and the physical port 31-6 such that the switching device 3 connects the communication port 22-2 of the intermediate communication device 2 to the measurement device 13.

The switching device 3 is a device that switches a transmission path of optical signals. The switching device 3 is, for example, an RPP or a crossbar switch. The switching device 3 acquires an instruction for wiring from the switching control device 5. The switching device 3 switches the wiring inside the switching device 3 based on the instruction for wiring. The switching device 3 thus switches a transmission path of optical signals between the upper network I and the lower network 4. In a case in which the upper control device 8 remotely confirms that the intermediate communication device 2 in the standby system has not broken down before the transmission path is switched to the standby system, the switching device 3 switches the transmission path of the optical signals such that the intermediate communication device 2 and the measurement device 13 are connected.

The switching device 3 connects the standby port included in the intermediate communication device 2 to the measurement device 13 based on the instruction for wiring. In FIG. 9, the switching device 3 connects the communication port 21-2 of the intermediate communication device 2-N selected as an example of the standby port to the measurement device 13, using the physical ports 31-1 and the physical port 31-3. The switching device 3 connects the communication port 22-2 of the intermediate communication device 2-N selected as an example of the standby port to the measurement device 13, using the physical port 31-4 and the physical port 31-6. The switching device 3 notifies the switching control device 5 of the fact that the switching of the wiring inside the switching device 3 has been completed.

The measurement device 13 is a device that measures optical signals. In FIG. 9, the measurement device 13 is connected to the physical port 31-3 of the switching device 3 in advance in one example. The measurement device 13 is connected to the physical port 31-6 of the switching device 3 in advance in one example.

In a case in which the upper control device 8 remotely confirms that the intermediate communication device 2-N in the standby system has not broken down before the transmission path is switched to the standby system (for example, the communication port 21-2 and the communication port 22-2), the measurement device 13 is connected to the standby port (for example, the communication port 21-2 and the communication port 22-2) selected by the upper control device 8 via the switching device 3.

The measurement device 13 measures the optical signal (port state) of the connected standby port in response to control performed by the determination device 14. For example, the measurement device 13 measures the intensity of the optical signal of the connected standby port. In a case in which link-up or mutual communication has been achieved between the measurement device 13 and the standby port of the intermediate communication device 2, the intensity of the optical signal increases as compared with a case in which link-up or mutual communication has not been achieved between the measurement device 13 and the standby port of the intermediate communication device 2.

The measurement device 13 communicates with the intermediate communication device 2 including the selected standby port based on a predefined communication standard. In a case in which the measurement device 13 is an optical transceiver, the measurement device 13 may perform communication based on the Ethernet (trade name) communication standard such as 10GBASE-SR or 10GBASE-LR.

The determination device 14 acquires a communication u port number of the intermediate communication device 2 from the intermediate communication device 2 by the measurement device 13 executing a loopback command.

The determination device 14 may acquire, from the intermediate communication device 2, the communication port number of the intermediate communication device 2 by the measurement device 13 transmitting a link layer discovery protocol (LLDP) packet to a multicast address. After the measurement device 13 transmits the LLDP packet to the multicast address, the intermediate communication device 2 acquires predetermined information such as an interface number from the LLDP packet. After the intermediate communication device 2 transmits the LLDP packet to the multicast address, the determination device 14 may acquire predetermined information such as an interface number from the LLDP packet.

The determination device 14 determines whether link-up or mutual communication has been achieved between the intermediate communication device 2 including the selected standby port and the measurement device 13. Here, the expression that link-up has been achieved means that the measurement device 13 and the intermediate communication device 2 (opposing device) have been connected to each other and the measurement device 13 and the intermediate communication device 2 are brought into a communicable state. In a case in which the measurement device 13 performs communication using an Ethernet (trade name) protocol, for example, a physical layer (layer 1) of the measurement device 13 and a physical layer of the intermediate communication device 2 are connected to each other, and a state in which communication using the protocol can be performed in a data link layer (layer 2) is achieved. The expression that mutual communication has been achieved means that execution of a test signal such as "ping" or loopback or data transfer has successfully been performed.

The determination device 14 determines whether the intermediate communication device 2 including the selected standby port has broken down, based on the result of measuring the optical signal. In a case in which link-up or mutual communication has been established between the intermediate communication device 2 including the selected standby port and the measurement device 13, the determination device 14 determines that the intermediate communication device 2 has not broken down (normal).

Next, an operation example of the breakdown determination system 10 will be described.

Figure 10:
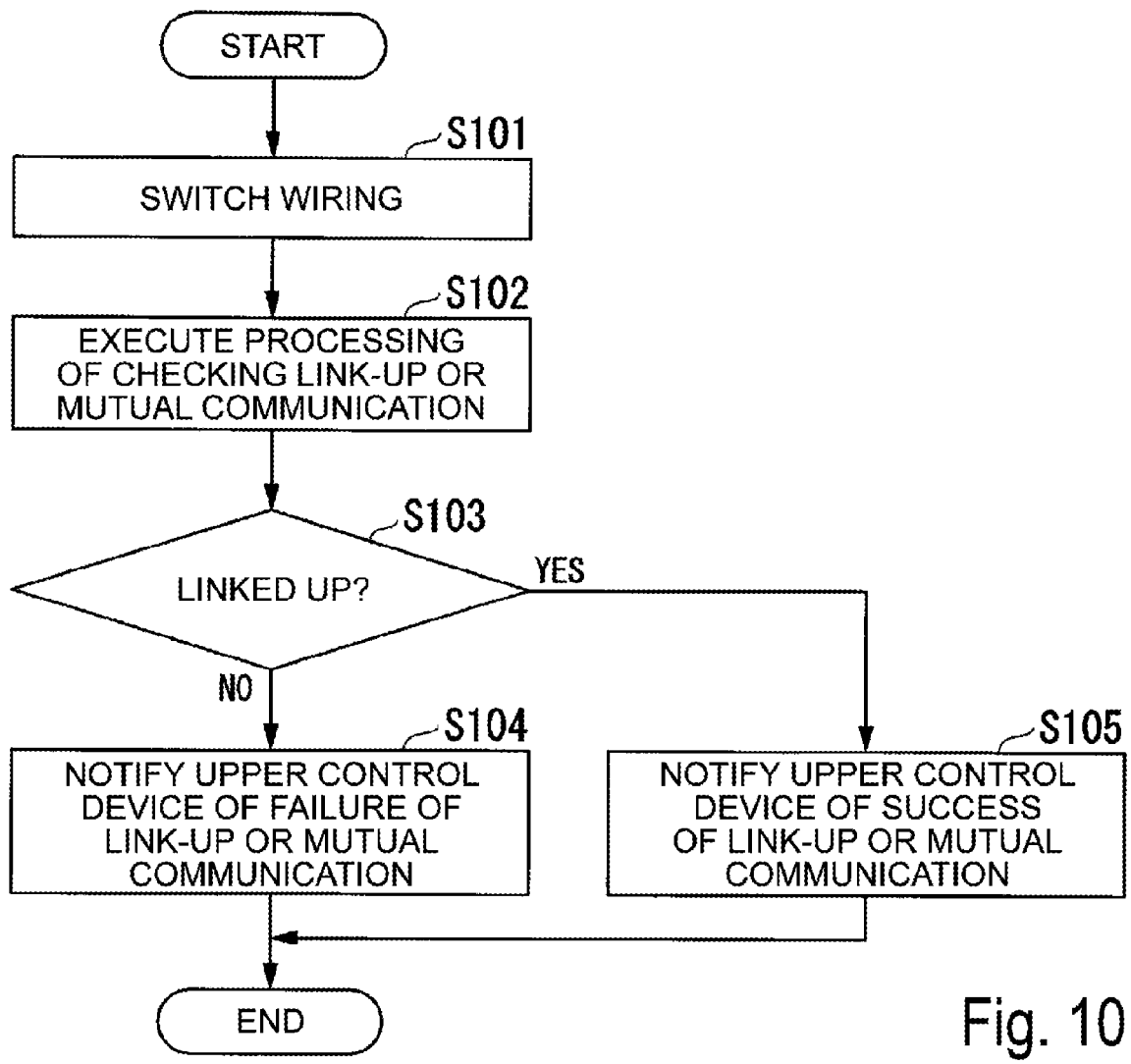
FIG. 10 is a flowchart illustrating an operation example of the breakdown determination system according to the first embodiment.

FIG. 10 is a flowchart illustrating an operation example of the breakdown determination system 10. The switching device 3 switches wiring inside the switching device 3 such that the intermediate communication device 2 and the measurement device 13 are connected, based on an instruction for wiring (Step S101). The measurement device 13 executes processing of checking link-up or mutual communication between the intermediate communication device 2 including the selected standby port and the measurement device 13 (Step S102). The determination device 14 determines whether link-up or mutual communication has been achieved between the intermediate communication device 2 including the selected standby port and the measurement device 13 (Step S103).

In a case in which neither link-up nor mutual communication has been achieved between the intermediate communication device 2 including the selected standby port and the measurement device 13 (Step S103: NO), the determination device 14 determines that the intermediate communication device 2 has broken down (not normal). The determination device 14 notifies the upper control device 8 of a failure of the link-up or mutual communication (Step S104).

In a case in which link-up or mutual communication has been achieved between the intermediate communication device 2 including the selected standby port and the measurement device 13 (Step S103: YES), the determination device 14 determines that the intermediate communication device 2 has not broken down (normal). The determination device 14 notifies the upper control device 8 of the success of link-up or mutual communication (Step S105).

Figure 11:
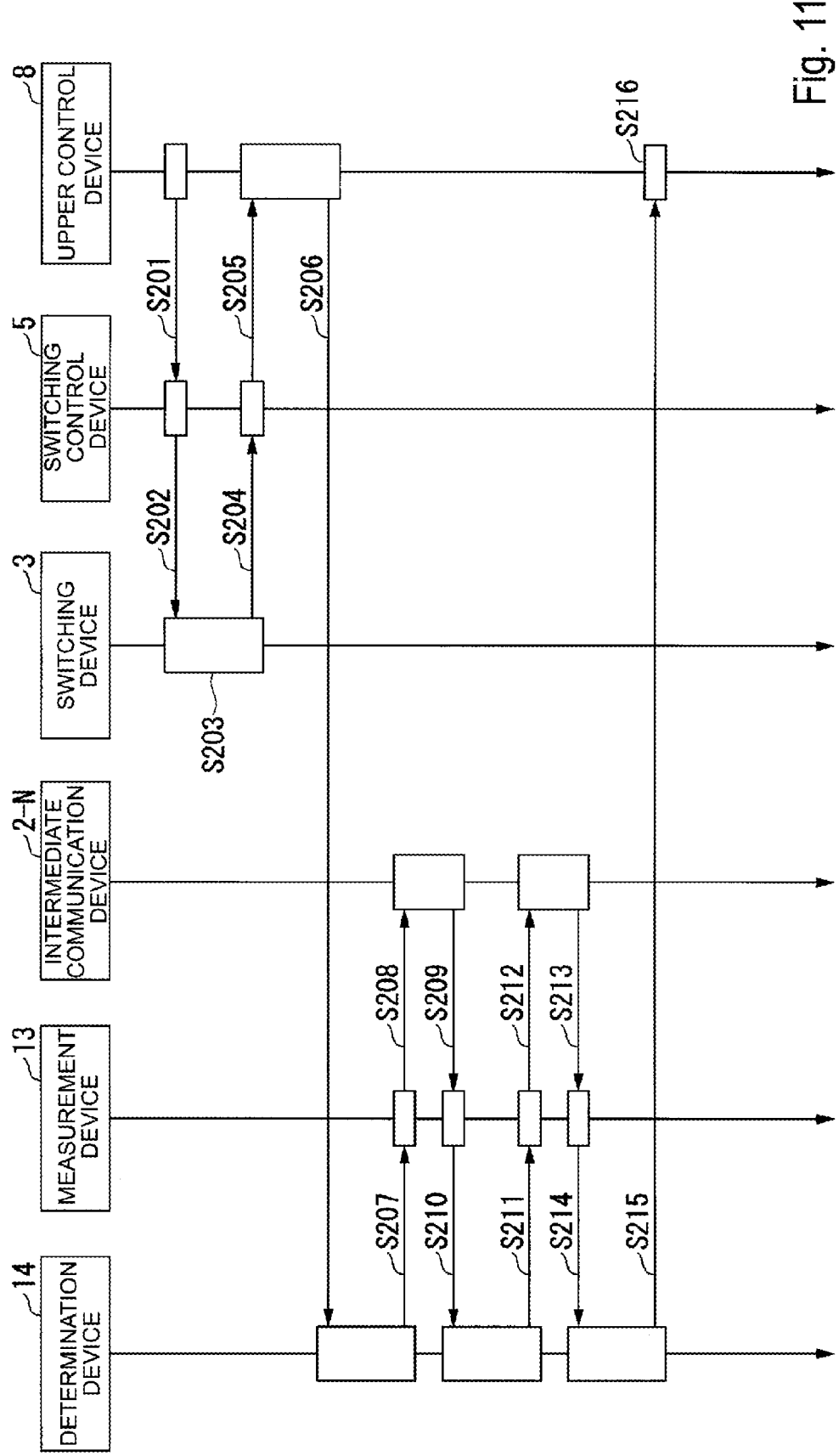
FIG. 11 is a sequence diagram illustrating an operation example of the breakdown determination system according to the first embodiment.

FIG. 11 is a sequence diagram illustrating an operation example of the breakdown determination system 10. The measurement device 13 and the switching device 3 are connected to each other in advance with a cable of an optical fiber. The intermediate communication device 2 and the switching device 3 are connected to each other in advance with a cable of an optical fiber. The breakdown determination system 10 executes the operations of the flowchart illustrated in FIG. 11 when the intermediate communication device 2 (standby device) including an standby port is equipped in the central office (when the breakdown determination system 10 is constructed). The breakdown determination system 10 may periodically execute the operations of the flowchart illustrated in FIG. 11.

In FIG. 11, the determination device 14 determines whether the intermediate communication device 2 has broken down, based on whether mutual communication has been achieved (connectivity) between the intermediate communication device 2 and the measurement device 13 in one example of the method for determining whether the intermediate communication device 2 has broken down.

The upper control device 8 selects the standby port included in the intermediate communication device 2 based on a predefined communication standard. The upper control device 8 may output information indicating the selected standby port to the switching control device 5 using an API (Step S201). The switching control device 5 selects a combination with the physical port 31 and provides, to the switching device 3, an instruction for ng inside the switching device 3 based on a result of the selection (Step S202).

The switching device 3 switches the wiring inside the switching device 3 such that the intermediate communication device 2 and the measurement device 13 are connected, based on the instruction for wiring (Step S203). The switching device 3 notifies the switching control device 5 of the fact that switching of the wiring inside the switching device 3 has been completed (Step S204). The switching control device 5 notifies the upper control device 8 of the fact that the wiring inside the switching device 3 has been completed (Step S205). The upper control device 8 outputs an instruction for starting determination processing to the determination device 14 (Step S206).

The determination device 14 outputs, to the measurement device 13-1, an instruction for starting measurement processing related to the selected standby port (Step S208). The measurement device 13 transmits, to the intermediate communication device 2-N, a command of "ping", for example, using an echo command of the Internet control message protocol (iCMP) (Step S208). The intermediate communication device 2-N outputs a response signal corresponding to the received "ping" command to the measurement device 13 (Step S209). The measurement device 13 outputs, to the determination device 14, information indicating that the response signal to the "ping" command has been received (Step S210).

In a case in which another standby port has further been selected by the upper control device 8, the determination device 14 outputs, to the measurement device 13, an instruction for starting measurement processing related to the further selected standby port (Step S211). The measurement device 13 transmits, to the intermediate communication device 2-N, a "ping" command, for example, using an echo command of the ICMP (Step S212). The intermediate communication device 2-N outputs, to the measurement device 13, a response signal to the received "ping" command (Step S213). The measurement device 13 outputs, to the determination device 14, information indicating that the response signal to the "ping" command has been received (Step S214).

In a case in which mutual communication has been achieved between the intermediate communication device 2 including the selected standby port and the measurement device 13, the determination device 14 determines that the intermediate communication device 2 has not broken down (normal) (Step S215). The upper control device 8 records the result of determining whether the intermediate communication device 2 including the selected standby port has broken down, in a predetermined storage device for each standby port (Step S216).

As described above, the breakdown determination system 10 according to the first embodiment includes the switching device 3, the intermediate communication devices 2-1 to 2-N, the upper control device 8 (selection device), the measurement device 13, the determination. device 14, and the storage device of the upper control device 8. The switching device 3 switches a transmission path of optical signals between the upper network 1 and the lower network 4. The intermediate communication devices 2 relay communication between the upper network 1 and the tower network 4. The upper control device 8 selects a standby port of the intermediate communication devices 2. The upper control device 8 may periodically select a standby port the intermediate communication devices 2. The measurement device 13 is connected to the standby port selected by the upper control device 8 via the switching device 3. The measurement device 13 measures an optical signal of the connected standby port. The determination device 14 determines whether the intermediate communication device including the selected standby port has broken down, based on a result of measuring the optical signal. The upper control device 8 (storage device) stores a result of determining whether the intermediate communication device 2 has broken down.

In this manner, whether the intermediate communication device 2 including the standby port has broken down is determined in advance. This allows breakdown determination system 10 according to the first embodiment to remotely confirm that the intermediate communication device 2 (standby device) of the standby system has not broken down before the transmission path is switched to the standby system. The breakdown determination system 10 can remotely confirm that the wiring of the transmission path is normal before the transmission path is switched to the standby system.

It is possible to avoid a risk that the remote construction operation cannot be completed because of incorrect wiring. The breakdown determination system 10 can ascertain breakdown. of the standby device before starting to run the standby device, and it is thus possible to shorten the time for recovery from the breakdown.

Second Embodiment

The second embodiment is different from the first embodiment in that the upper control device 8 selects a standby port that meets a condition of a communication standard of an optical signal based on a provided communication service or the like. In the second embodiment, differences from the first embodiment will be described.

Figure 12:
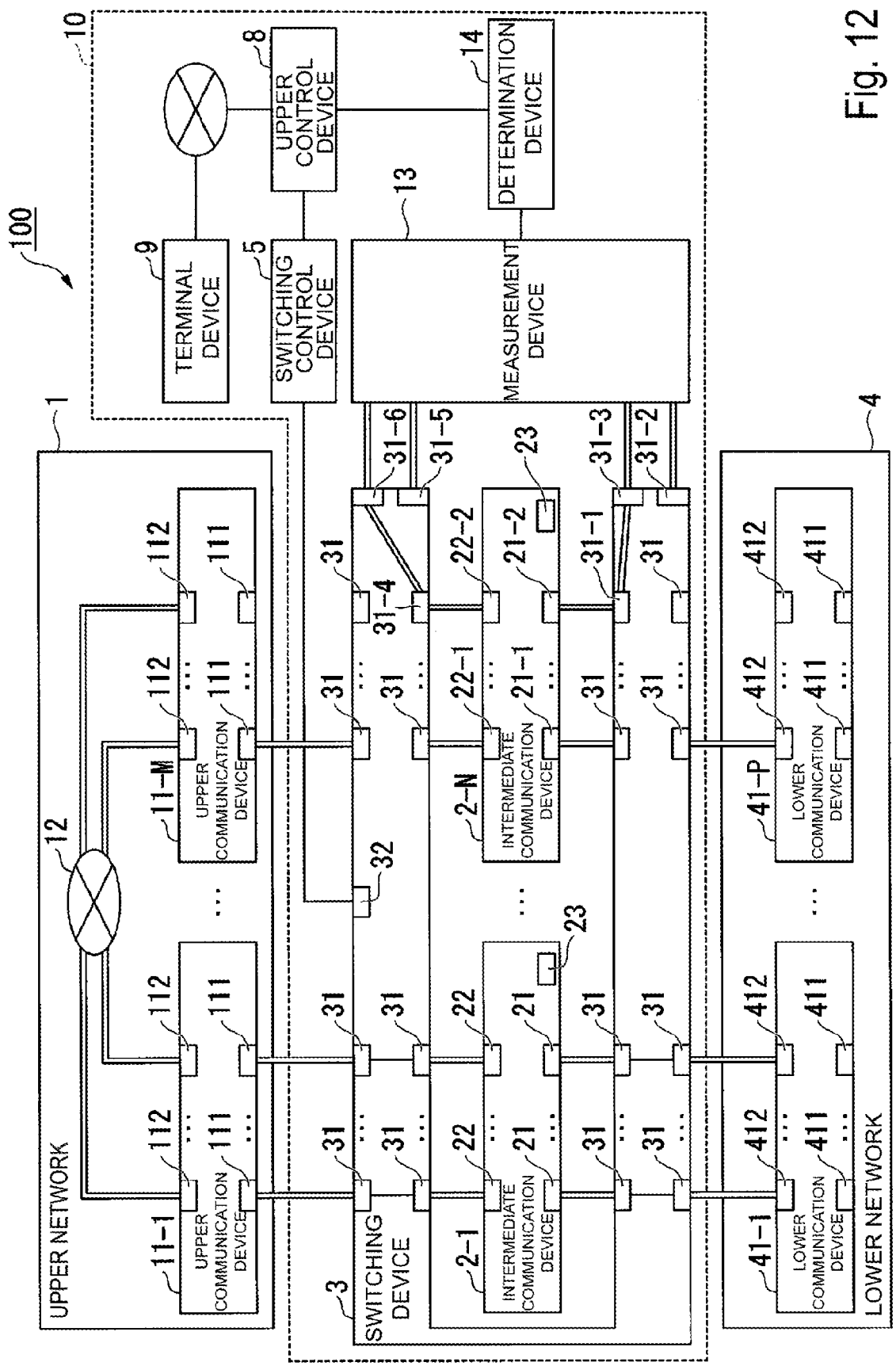
FIG. 12 is a diagram illustrating a configuration example of a breakdown determination system according to a second embodiment.

FIG. 12 is a diagram illustrating a configuration example of a breakdown determination system 10. The breakdown determination system 10 includes intermediate communication devices 2-1 to 2-N, a switching device 3, a switching control device 5, an upper control device 8, a terminal device 9, a measurement device 13, and a determination device 14.

The upper control device S selects a standby port that meets a condition of a communication standard of an optical signal. The condition of the communication standard of the optical signal includes, for example, a communication speed of the communication port, a transmission mode of the optical signal, a wavelength of the optical signal, intensity of the optical signal, and the number of optical fiber cores. The condition of the communication standard of the optical signal is defined in advance in accordance with the type of a communication service provided in the optical communication network 100, for example. The measurement device 13 includes a communication port for each condition of the communication standard of the optical signal.

The determination device 14 acquires physical wiring information. Communication device information in the physical wiring information includes information indicating the condition of the communication standard of the optical signal of the standby port. The determination device 14 acquires information indicating the condition of the communication standard of the optical signal of the selected standby port.

The determination device 14 determines whether link-up or mutual communication has been achieved between the intermediate communication device 2 including the selected standby port and the measurement device 13, for each condition of the communication standard of the optical signal of the selected standby port. In a case in which link-up or mutual communication has been established between the intermediate communication device 2 including the selected standby port and the measurement device 13, the determination device 14 determines that the intermediate communication device 2 has not broken down (normal).

Next, an operation example of the breakdown determination system 10 will be described.

Figure 13:
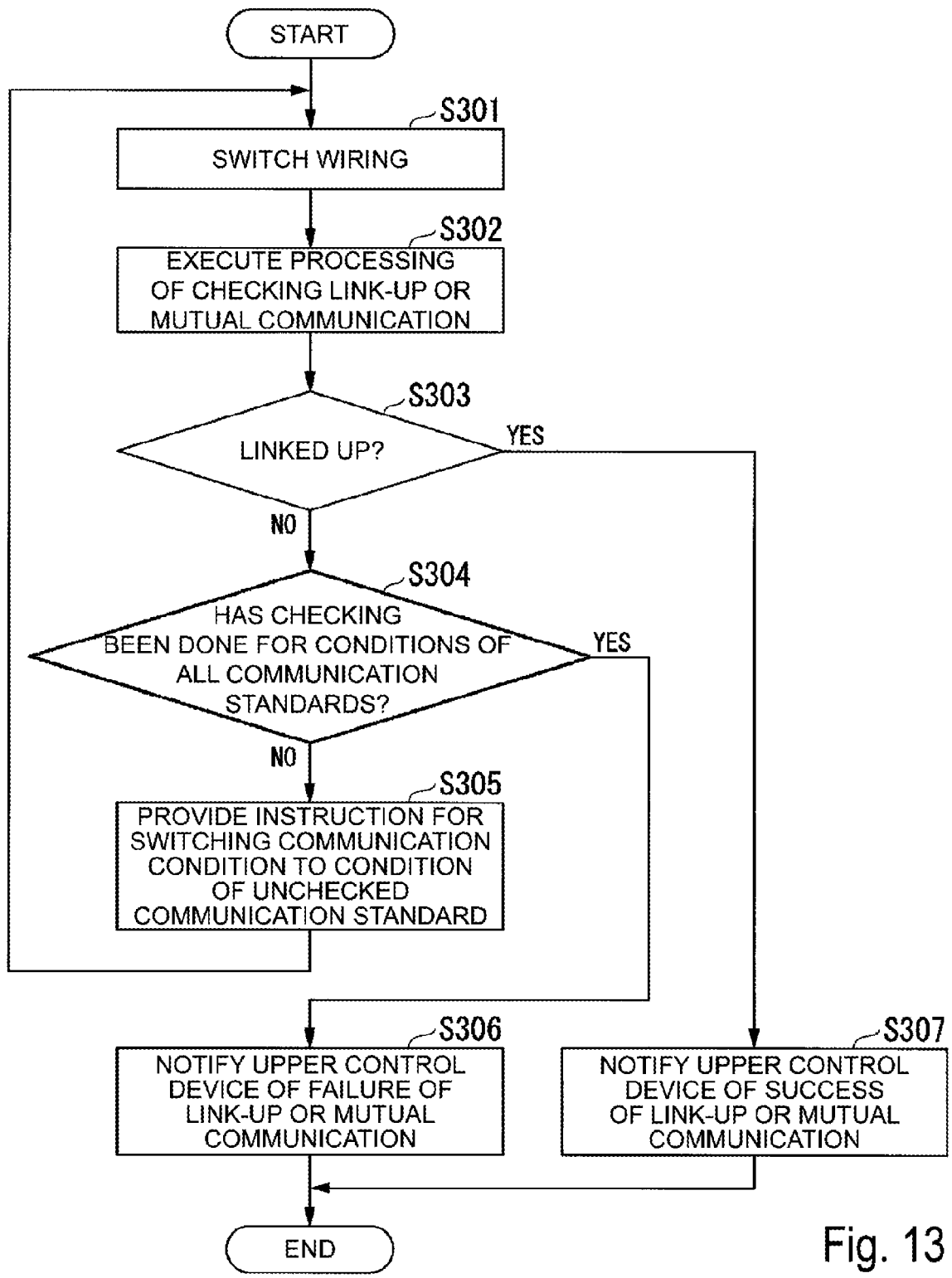
FIG. 13 is a flowchart illustrating an operation example of the breakdown determination system according to the second embodiment.

FIG. 13 is a flowchart illustrating an operation example of the breakdown determination system 10. Operations in Steps S301 to S303 are similar to the operations in Steps S101 to S103 illustrated in FIG. 10. In a case in which link-up or mutual communication has not been achieved between the intermediate communication device 2 including the selected standby port and the measurement device 13 (Step S303: NO), the determination device 14 determines whether the fact that link-up or mutual communication has not been achieved has been confirmed under all conditions of communication standards of the measurement device 13 (Step S304).

In a case in which the fact that neither link-up nor mutual communication has been achieved has not been confirmed under any of the conditions of communication standards (Step S304: NO), the determination device 14 outputs, to the measurement device 13, an instruction for switching the communication condition of the measurement device 13 to the unconfirmed communication standard (Step S305). In a case in which the fact that neither link-up nor mutual communication has been achieved has been confirmed under all the conditions of the communication standards of the measurement device 13 (Step S304: YES), the determination device 14 notifies the upper control device 8 of a failure of link-up or mutual communication (Step S306).

In a case in which link-up or mutual communication has been achieved between the intermediate communication device 2 including the selected standby port and the measurement device 13 (Step S303: YES), the determination device 14 determines that the intermediate communication device 2 has not broken down (normal). The determination device 14 notifies the upper control device 8 of success of link-up or mutual communication (Step S307).

Figure 14:
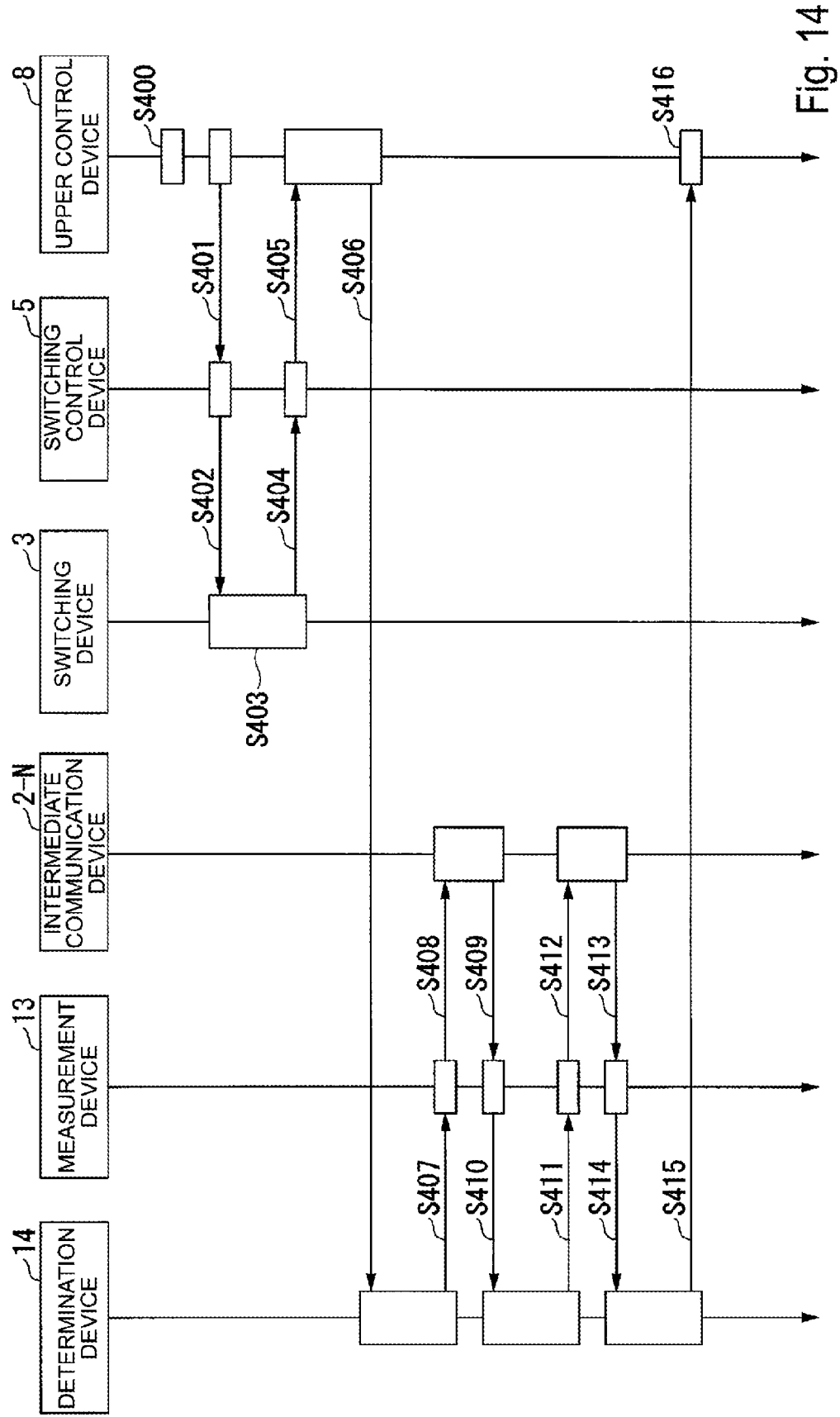
FIG. 14 is a sequence diagram illustrating an operation example of the breakdown determination system according to the second embodiment.

FIG. 14 is a sequence diagram illustrating an operation example of the breakdown determination system 10. The upper control device 8 selects a standby port that meets a condition of the communication standard of the optical signal in accordance with the type of communication service provided in the optical communication network 100 (Step S400). Operations in Steps S401 to S416 are similar to the operations in Steps S201 to S216 illustrated in FIG. 11. The breakdown determination system 10 repeats the operations in Steps S401 to S416 every time the standby port that meets the condition of the communication standard of the optical signal is selected in Step S400.

As described above, the upper control device 8 according to the second embodiment selects a standby port that meets a predefined condition of the communication standard of the optical signal. Whether the intermediate communication device 2 including the standby port has broken down is determined in advance for each condition (port condition) of the communication standard of the optical signal. This allows the breakdown determination system 10 according to the second embodiment to remotely confirm that the intermediate communication device 2 (standby device) of the standby system has not broken down before the transmission path is switched to the standby system for each condition of the communication standard of the optical signal. The breakdown determination system 10 can remotely confirm that the wiring of the transmission path is normal before the transmission path is switched to the standby system for each condition of the conummication standard of the optical signal.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to an optical communication system.

REFERENCE SIGNS LIST

1 Upper network
2 Intermediate communication device

3 Switching device
4 Lower network
5 Switching control device
6 Communication control device
7 Network management device
8 Upper control device
9 Terminal device
10 Breakdown determination system
11 Upper communication device
12 Communication line
13 Measurement device
14 Determination device
21 Communication port
22 Communication port
23 Setting port
31 Physical port
32 Control port
41 Lower communication device
42 Communication port
51 Interface
52 Wiring information acquisition unit
53 Switching device wiring information storage unit
54 Wiring availability determination unit
55 Wiring instruction unit
56 Response receiving unit
57 Wiring information updating unit
71 Allocation management unit
72 Interface
73 Information creation unit
74 Allocation information storage unit
75 Physical wiring management unit
76 Interface
77 Physical wiring information acquisition unit
78 Physical wiring information updating unit
79 Physical wiring information storage unit
100 Optical communication network
110 Communication system
111 Communication port
112 Communication port
113 Setting port
411 Communication port
412 Communication port
413 Setting port

The invention claimed is:

1. A breakdown determination system comprising:
a switching device configured to switch a transmission path of optical signals between an upper network and a lower network;
one or more intermediate communication devices configured to relay communication between the upper network and the lower network;
a selection device configured to select a standby port of the one or more intermediate communication devices;
a measurement device configured to connect, via the switching device, to the standby port that is selected and measure an optical signal of the standby port that is connected;
a determination device configured to determine whether an intermediate communication device of the one or more intermediate communication devices including the standby port that is selected breaks down based on a result of measuring the optical signal; and
a storage device configured to store a result of determining whether the intermediate communication device breaks down,
wherein the selection device selects the standby port that meets a condition of a communication standard of the optical signal,
wherein each of the switching device, the one or more intermediate communication devices, the selection device, the measurement device, the determination device and the storage device are implemented by:
i) computer executable instructions executed by at least one processor,
ii) at least one circuity or
iii) a combination of computer executable instructions executed by at least one processor and at least one circuity.

2. The breakdown determination system according to claim 1, wherein the selection device periodically selects the standby port of the one or more intermediate communication devices.

3. The breakdown determination system according to claim 1, wherein the storage device is configured to store, for each standby port, the result of determining whether the intermediate communication device breaks down.

4. The breakdown determination system according to claim 1, wherein the selection device is configured to perform the selection based on a provided communication service.

5. The breakdown determination system according to claim 1, wherein the determination device is configured to performed the determination for each condition of the communication standard of the optical signal of the standby port selected.

6. The breakdown determination system according to claim 1, wherein the determination device is configured to perform the determination before the transmission path is switched to a standby system.

7. A breakdown determination method executed by a breakdown determination system, the method comprising:
switching a transmission path of optical signals between an upper network and a lower network;
selecting a standby port of an intermediate communication device configured to relay communication between the upper network and the lower network;
connecting, via a switching device configured to switch the transmission path of the optical signals between the upper network and the lower network, to the standby port that is selected and measuring an optical signal of the standby port that is connected;
determining whether the intermediate communication device including the standby port that is selected breaks down based on a result of measuring the optical signal; and
recording, in a storage device, a result of determining whether the intermediate communication device breaks down,
wherein, in selecting the standby port, the standby port that meets a condition of a communication standard of the optical signal is selected.

* * * * *